United States Patent [19]

Weber

[11] 3,956,170

[45] May 11, 1976

[54] COUPLED ION EYE-SAFE LASER MATERIAL

[75] Inventor: Marvin J. Weber, Wayland, Mass.

[73] Assignee: Raytheon Company, Lexington, Mass.

[22] Filed: July 1, 1974

[21] Appl. No.: 484,907

Related U.S. Application Data

[60] Continuation of Ser. No. 285,959, Sept. 5, 1972, abandoned, which is a division of Ser. No. 116,987, Feb. 19, 1971, Pat. No. 3,715,683.

[52] U.S. Cl. ............................................ 252/301.4 R
[51] Int. Cl.² .......................................... C09K 11/46
[58] Field of Search .............................. 252/301.4 R

[56] References Cited

UNITED STATES PATENTS

| | | | |
|---|---|---|---|
| 3,550,033 | 12/1970 | Ohlman et al. | 252/301.4 R X |
| 3,591,517 | 7/1971 | van der Ziel | 252/301.4 R X |
| 3,719,901 | 3/1973 | Monchamp et al. | 252/301.4 R X |
| 3,725,811 | 4/1973 | Murphy | 252/301.4 R X |

OTHER PUBLICATIONS

Weber et al., "Applied Physics Letters" Vol. 15, No. 10, 1969, pp. 342–345.

*Primary Examiner*—Jack Cooper
*Attorney, Agent, or Firm*—John R. Inge; Joseph D. Pannone; Milton D. Bartlett

[57] ABSTRACT

A coupled ion laser operating at a frequency determined by the energy levels characteristic of the coupling of a lanthanide or actinide group ion with an iron group ion in an orthoaluminate material, such as yttrium orthoaluminate, is described in which low threshold high efficiency starting operation at predetermined frequencies in the region of eye safety is provided.

1 Claim, 3 Drawing Figures

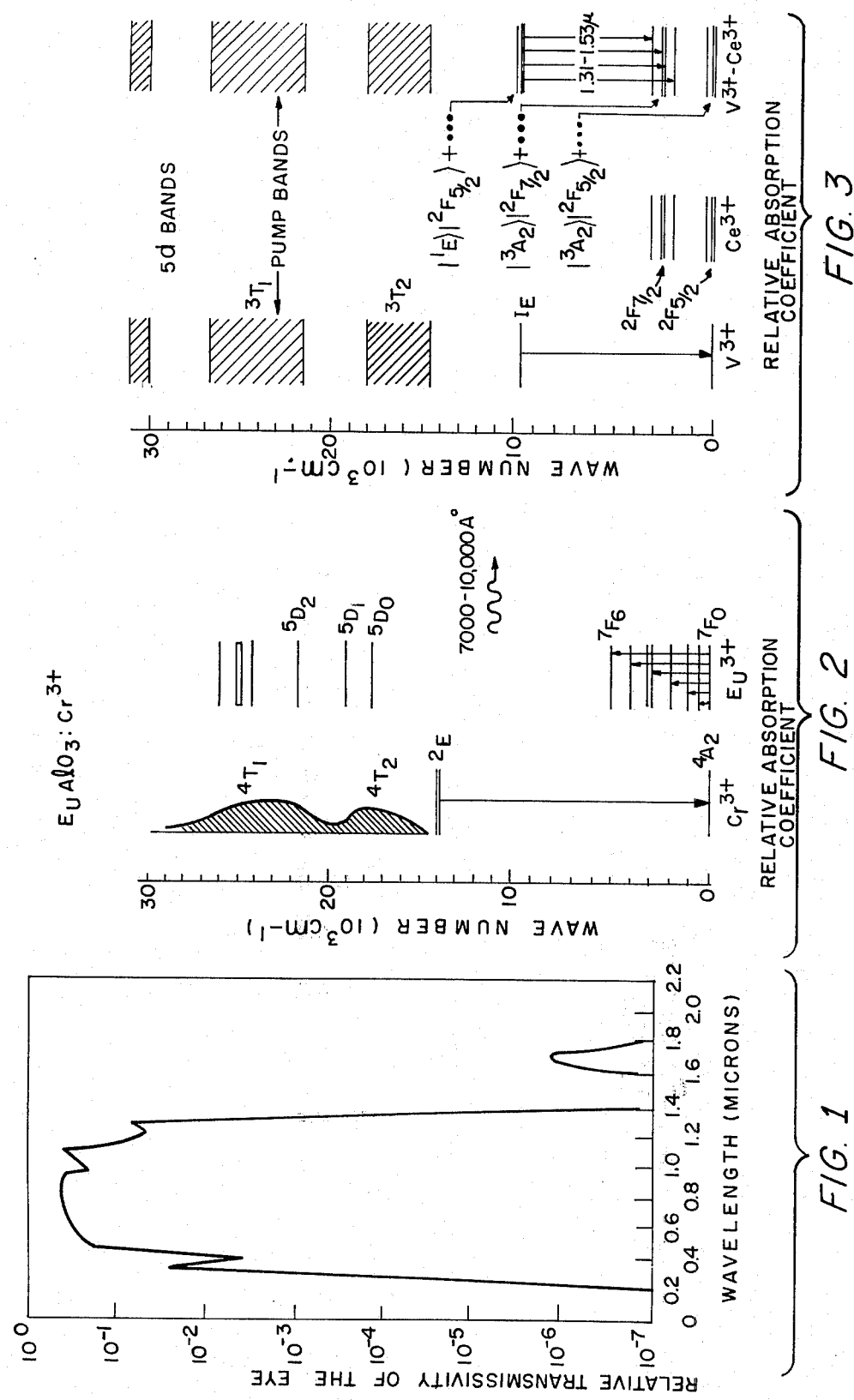

COUPLED ION EYE-SAFE LASER MATERIAL

CROSS REFERENCE TO RELATED APPLICATIONS

This is a continuation of application Ser. No. 285,959 filed Sept. 5, 1972 (now abandoned), which is a division of application Serial No. 116,987 filed Feb. 19, 1971, now U.S. Pat. No. 3,715,683.

CROSS REFERENCE TO RELATED APPLICATIONS

Application Ser. No. 886,617 of Roch R. Monchamp, Marvin J. Weber and Michael Bass, entitled "Laser with a Monocrystalline $YAlO_3$:$Nd^{+3}$ Active Medium", filed Dec. 19, 1969 (now U.S. Pat. No. 3,614,662) and application Ser. No. 293,287 of Roch R. Monchamp, Marvin J. Weber and Edward M. Comperchio, entitled "Single Crystal $YAlO_3$ Laser Host Material and Method for Making Same", filed Sept. 28, 1972, which is a continuation of application Ser. No. 886,932 filed Dec. 22, 1969 (now abandoned), both of which are assigned to the same assignee as the present application, are hereby incorporated herein by reference.

BACKGROUND OF THE INVENTION

This invention relates to compositions of matter suitable for laser use and to laser systems utilizing such compositions. More specifically, the invention relates generally to laser materials of the coupled ion type and particularly to devices generating coherent radiation in the wavelength region greater than 1.4 microns, the eye safe region.

In the prior art, lasers which were able to operate at frequencies in the eye safe region suffered from either low efficiency, high threshold starting, inability to operate at room temperature, and the requirement for cryogenic cooling; or from combinations of these problems. This is because lasers operate at fixed frequencies which are determined by the energy level scheme of the materials from which the lasing element is fabricated.

Possible eye damage from inadvertant exposure to coherent radiation produced by lasers operating in the region between 0.2 and 1.4 microns, in which region energy is transmitted by the eye and focused on the retina causing injury and possible blindness is an important consideration when using lasers in nonlaboratory environments where safety cannot be readily controlled; such as in range finders, illuminators and designators and in commercial applications such as surveying construction alignment, and communications. Lasers of the prior art, which do not suffer from the above-mentioned deficiencies, operate in the non-eyesafe region below 1.4 microns.

The most common optically pumped solid state lasers of the prior art are ruby and trivalent neodymium ($Nd^{+3}$) as a dopant in a host material of yttrium aluminum garnet (YAG) ($Y_3Al_5O_{12}$) or glass. The operating frequency of the ruby laser is approximately 0.694 microns and that of the YAG laser is approximately 1.06 microns, hence their use constitutes an eye hazard.

An approach of the prior art to obtain eye safe laser operation has been the use of other lasing ions having laser transitions at longer wavelengths than either ruby or YAG, the most notable examples being trivalent erbium ($Er^{+3}$) as a dopant in glass, which has an operating frequency of 1.54 microns, trivalent erbium as a dopant in YAG which operates at 1.65 microns and trivalent holmium ($Ho^{+3}$) as a dopant in YAG which operates at 2.1 microns.

Another prior art technique to obtain laser operation in the eye safe region has been to down-convert the emission of a laser, for example, the 1.06 micron $Nd^{+3}$ emission, to longer wavelengths using either parametric effects or a Raman active medium.

These techniques have serious shortcomings in that while operation at eyesafe frequencies is achieved, the operation is at low efficiency. For example, both $Er^{+3}$ and $Ho^{+3}$ lasers have relatively high thresholds of oscillation at room temperatures, and must be cryogenically cooled to achieve low threshold oscillation, the threshold of oscillation being the energy required to achieve a population inversion. If the threshold for laser action is high the laser must be pumped at higher energies, hence the overall efficiency of these lasers is low at room temperature. Since efficient operation at room temperature is desirable, there have been attempts to improve the optical pumping efficiency thereby reducing the threshold of the $Er^{+3}$ and $Ho^{+3}$ lasers by the addition of various codopant ions; however, there are few satisfactory codopants for $Er^{+3}$. Other paramagnetic ions have been unsuitable for efficient, high-power laser operation in the eye safe region.

SUMMARY OF THE INVENTION

The present invention relates to a laser material containing coupled ions to obtain laser action at wavelengths other than those possible in single laser ion noncoupled systems. More particularly, efficient laser operation in the eye safe region at room temperature in a coupled ion system using the material $YR_x AlM_{1-x}O_3$ is provided in which R is either a lanthanide group ion or an actinide group ion, M is an iron group ion and x is in the range of from greater than zero to less than one. Both of these ions are formed in a solid solution with an orthoaluminate such as yttrium-orthoaluminate to produce a coupling of the ions of R and M with resultant energy levels which provide laser operation at a wavelength which is shifted with respect to that of the ions individually. For eyesafe operation, R and M may, for example, be chosen to be trivalent cerium ($Ce^{+3}$) and trivalent vanadium ($V^{+3}$) to give efficient laser operation in the region between 1.30–1.55 microns.

Emission of coherent radiation in accordance with the principles of the present invention is produced by the stimulated energy decay of excited electrons from the fluorescent level of one element to a normally depopulated energy level above the ground state of another element. This ion coupling is caused by electron exchange between the two ions and a composite energy level scheme results, which is different from that of either element individually. Excitation is provided by optical pumping, and may be defined as the imparting of energy to electrons in one level to raise them to a higher level.

BRIEF DESCRIPTION OF THE DRAWINGS

FIG. 1 is a graph of the relative transmissivity of the eye at various wavelengths of laser operation.

FIG. 2 is a diagram of the energy levels of trivalent chromium in isomorphic crystals of $YAlO_3$ and of trivalent europium in $EuAlO_3$.

FIG. 3 is a diagram of the energy levels of individual trivalent vanadium and trivalent cerium ions in $YAlO_3$ and of a coupled ion trivalent vanadium and trivalent cerium ion pair in $YAlO_3$.

DESCRIPTION OF THE PREFERRED EMBODIMENTS

Referring now to FIG. 1, a graph of the relative ocular transmissivity of the human eye to various laser operating frequencies is illustrated. Of course, the more energy the eye transmits and focuses on the retina, the greater the probability of eye damage becomes. It may be observed that the ocular transmissivity of the eye at wavelengths greater than 1.4 microns is at least six orders of magnitude smaller than the ocular transmissivity in the visible and near infrared regions between 0.2 and 1.4 microns. It is apparent that at laser operating frequencies greater than 1.4 microns, the eye transmits only a tiny fraction of the energy impinging on the cornea to the retina.

It has been observed by van der Ziel and Van Uitert and reported in the Physics Review Letter, Vol. 21, 1334 (1968), in an investigation of the emission spectrum of an europium aluminate crystal ($EuAlO_3$) doped with chromium impurities that in addition to the R-line fluorescence characteristics of trivalent chromium ($Cr^{3+}$), a number of other lines appeared at longer wavelengths. This observation is more clearly understood with reference to FIG. 2, in which the energy levels of trivalent chromium ($Cr^{3+}$) in the isomorphic crystal $YAlO_3$, yttrium orthoaluminate and the energy levels of $Eu^{3+}$ in europium orthoaluminate ($EuAlO_3$) are shown. The transition of $Cr^{3+}$ ions from the $^2E$ energy level to the $^4A_2$ energy level results in the $^2E \rightarrow {}^4A_2$ R-line fluorescence characteristic of $Cr^{3+}$. New emission lines at 7000 to 10,000 Angstroms were observed, and these frequencies are correlated with a process by which an excited $Cr^{3+}$ ion in a $^2E$ energy state decays to a $^4A_2$ energy state and simultaneously excites a neighboring $Eu^{3+}$ ion to an excited $^7F_6$ state as indicated by the arrows in FIG. 2. The energy difference of these two transitions appears as a photon in the wavelength range between 7000 and 10,000 Angstroms. Since the emission process ends with the chromium ion in its ground state and an europium ion in an excited state, it is called europium-terminated chromium fluorescence. Fluorescence is the property of spontaneously emitting radiation as the result of absorption of radiation from some other source. The emitted radiation persists only as long as the material is subjected to radiation.

The new energy levels occur as a result of a coupling between the rare earth ions, such as $Eu^{3+}$ and an ion group ion such as $Cr^{3+}$. This coupling may occur by magnetic, electric multipole, or exchange interactions. The emission lines are characteristic of a coupled ion pair and are similar to the pair spectra of coupled rare earth — rare earth ions as reported by Varsanyi and Dieke, Physics Review Letters, Vol. 7, 442 (1961) and $Cr^{3+}$ — $Cr^{3+}$ ions as reported by Schawlow et al., Physics Review Letter, Vol. 3, 502 (1959). The $Eu^{3+}$ and $Cr^{3+}$ ions in $EuAlO_3:Cr^{3+}$ are coupled by exchange interactions. The additional long wavelength emission lines involve excitation of the europium system and therefore can be considered as exciton sidebands of the localized $Cr^{3+}$ exciton emission.

In addition to $Cr^{3+}$ — rare earth pair emission in $EuAlO_3:Cr^{3+}$, pair emission has also been observed in $TbAlO_3:Cr^{3+}$ $YbAlO_3:Cr^{3+}$, $Eu_3Ga_5O_{12}:Cr^{3+}$ and $Y_{1-x}Ce_xAlO_3:Cr^{3+}$. None of these systems fluoresce at wavelengths greater than 1.4 microns.

In accordance with the present invention, it has been discovered that laser action in materials containing coupled ions will occur in addition to the fluorescence of the prior art in combinations of ions of the rare earth lanthanides or actinides and the transition metal ions in an orthoaluminate, such as yttrium orthoaluminate and that the ion coupling of trivalent vanadium $V^{3+}$ and trivalent cerium $Ce^{3+}$ in particular produces an efficient laser operating in the eyesafe region. This class of materials is of the type $Y_{1-x}R_xAl_{1-y}M_yO_3$ where R is an actinide or lanthanide which comprises the rare earth elements of atomic numbers 57 through 70 and the actinide group elements, and where M comprises the iron transition group elements of atomic numbers 21 through 30. These ions are dispersed in a solid solution in a seeded melt with yttrium orthoaluminate using, for example, the Czochralski method of crystal growth as is described with reference to the aforesaid copending patent applications. The amount of R which is required is high, with x values which may approach one for an ion coupled system. This is because R must be uniformly dispersed in the solid solution to couple with M, which is much less populous.

Referring now to FIG. 3, the lower energy levels of $V^{3+}$ ions individually in $YAlO_3$ and of $Ce^{3+}$ ions individually in $YAlO_3$ are illustrated. It may be observed that $V^{3+}$ ions alone in $YAlO_3$ form a three level laser system, with the third level comprising the pump bands centered at about 15,000, 25,000 and 30,000 wave numbers at the $^3T_1$, $^3T_2$ energy levels; the second level, a fluorescent level at 10,000 wave numbers and the ground state at zero wave numbers which is normally occupied by all electrons. To obtain lasing action from this system, a population inversion must be produced to a population of N ions of $V^{3+}$, thus at least N/2 ions must be pumped into the pump bands in order to decay into the second level. Lasing then would result from $V^{3+}$ ions decaying back from the second level to the first level.

When $Ce^{3+}$ and $V^{3+}$ are present in $YAlO_3$, and a small amount of $V^{3+}$, less than approximately one percent, is substituted at the $Al^{3+}$ lattice sites, the $Ce^{3+}$ and $V^{3+}$ ions in the lattice are exchanged coupled by intervening oxygen ions. The approximate energy levels for a coupled $V^{3+}$ — $Ce^{3+}$ ion pair is illustrated in simplified form in FIG. 3. The zero order energy levels are approximately the sum of the single ion energy levels and the wave functions of the coupled ion states are simple products of single ion wave functions. Minor splittings and shifts of the energy levels and admixing of states, which are required in electric-dipole transitions are caused by the exchange interaction.

It has been discovered that the coupled ion system results in a four level laser with an additional normally unpopulated absorbtion band being introduced as a result of $Ce^{3+}$ and $V^{3+}$ exchange coupling at a series of energy bands centering approximately around wave number three. Operationally, a far more efficient laser system results since only a small number of ions must be pumped into the pump bands vis-a-vis the three level trivalent vanadium system. This is because electrons in the ground state at $$|{}^3A_2> |{}^2F_{5/2}> + \ldots$$

which are pumped into the pump bands at $^3T_1$ and $^3T_2$ of the fourth level and which decay to the third energy level at $$|^1E> \, | \, ^2F_{5/2}>+ \ldots$$

will produce stimulated emission immediately upon decay to the second level $$|^3A_2> \, | \, ^2F_{7/2}>+ \ldots$$

because that level is normally unpopulated, hence a population inversion between levels three and two occurs when only a small number of electrons decay from level four to level three, and which results in a stimulated emission in a 1.31–1.53 micron region. Thus, it may be seen that the ion exchange phenomenon of the present invention enables lasing at this unexpected wave length and with greatly reduced energy pumping requirements.

In summary, $V^{3+}$ decays from the "one"$_E$ energy level to the $^3A_2$ energy level, while $Ce^{+3}$ has stable states at the $^2F_{7/2}$ and $^2F_{5/2}$ levels. When $Ce^{3+}$ and $V^{3+}$ are ion coupled, new transitions at other energy levels occur. In particular, a group of transitions between the $/^1E/^2F_{5/2}>$ and $/^3A_2>/^2F_{7/2}>$ levels occur in the region between 1.3–1.6 microns which includes the eye safe region. Selected frequencies within this range may be obtained by the variation of the optical cavity reflectivity or losses in a conventional manner such as variation in the dielectric constant on the cavity mirror or by filtering.

The stimulated emission obtained using cerium terminated vanadium fluorescence in a coupled ion system in accordance with the present invention constitutes a new laser material with emission falling approximately in the range of 1.30–1.55 microns, with the exact energy levels and wavelengths dependent upon the specific lattice. Additionally, this new energy level is unpopulated at ambient temperatures and is thus suitable for a four-level laser. As is apparent from FIG. 3, the $^2F_{7/2}$ levels of $Ce^{3+}$ are located at energies of approximately 3,000°K. Assuming the stimulated emission probabilities to the $^2F_{5/2}$ and $^2F_{7/2}$ states are of the same order of magnitude, the $^2F_{7/2}$ state will have the lower threshold for laser action. Furthermore, $V^{3+}$ has broad absorption bands which are conducive to efficient optical pumping, instead of the narrow rare-earth energy levels in the cases of $Er^{3+}$ and $Ho^{3+}$ lasers.

Laser action in the eye safe region may be achieved by other combinations of vanadium and other rare-earths. The host material must contain large quantities of rare-earth ions and be capable of being doped with up to one percent of trivalent vanadium. Other crystal phases of the rare-earth oxide-aluminum oxide system offer possible suitable lattice structures. These include $RAlO_3$ (perovskite), $R_3Al_{15}O_{12}$ (garnet) and $R_2Al_4O_9$ (2:1 compound); where R is a trivalent rare earth and $V^{3+}$ substitutes at $Al^{3+}$ sites in the lattice. These materials can be grown using the Czochralski technique.

As described in the beforementioned application of Monchamp et al., $YAlO_3$ may be formed in a single large crystal by melting $Y_2O_3$ and $Al_2O_3$ in an inert atmosphere, seeding the melt with a $YAlO_3$ crystal and slowly withdrawing the seed from the melt. The lattice sites of $YAlO_3$ are such that coupling is stronger than that in YAG, thereby making $YAlO_3$ a more suitable host material than YAG for an ion coupled system since interaction between ions in adjacent lattice sites have an increased probability of occurrence. This is due to the distance between the unit cells of the lattice and the arrangement of ions therein. To insure ion coupling, a large percentage of onee trivalent ion dopant, for example, cerium, is uniformly dispersed throughout the solid solution. The second trivalent ion dopant, for example, vanadium is introduced into only a small percentage of the lattice sites (less than 1 percent) of the cerium doped $YAlO_3$; however, this trivalent vanadium is always adjacent to some of the much more populous trivalent cerium. X-ray analysis of this material indicates an orthorhombic unit cell; however, concentration of certain of the lanthanides, cerium and praseodymium in particular, approaching 100% substitution for yttrium in an $YAlO_3$ host would form a rhombohedral crystal structure. The $Y_{1-x}R_xAl_{1-y}M_yO_3$ coupled ion system is formed as a single crystal which is anisotropic. It is to be understood that other perovskite-like compounds isomorphic with $YAlO_3$ may serve as host materials in a coupled ion laser system in accordance with the present invention.

While particular embodiments of the invention have been shown and described, various modification thereof will be apparent to those skilled in the art, and therefore it is not intended that the invention be limited to the disclosed embodiments or details thereof and departures may be made therefrom within the spirit and scope of the invention as defined in the appended claims.

What is claimed is:

1. A solid solution single crystal coupled ion laser material comprising $Y_{1-x}Ce_x^{+3}Al_{1-y}V_y^{+3}O_3$ in which $x$ is in the range of from greater than zero to one and $y$ is in the range of from greater than 0 to 0.01 wherein $Ce^{+3}$ and $V^{+3}$ are in an amount sufficient to effect lasing as coupled ions capable of producing coherent radiation at a wavelength between approximately 1.30 microns and 1.55 microns by stimulated emission from an energy state of said $V^{+3}$ having a population inversion of electrons produced therein to an energy state of said $Ce^{+3}$ having substantial depopulation of electrons at ambient temperatures.

* * * * *